(12) United States Patent
Takada

(10) Patent No.: US 8,166,284 B2
(45) Date of Patent: Apr. 24, 2012

(54) INFORMATION PROCESSING DEVICE

(75) Inventor: Masashi Takada, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 317 days.

(21) Appl. No.: 12/420,051

(22) Filed: Apr. 7, 2009

(65) Prior Publication Data
US 2009/0254739 A1 Oct. 8, 2009

(30) Foreign Application Priority Data

Apr. 8, 2008 (JP) ................................. 2008-100121

(51) Int. Cl.
G06F 9/00 (2006.01)
G06F 12/14 (2006.01)
(52) U.S. Cl. ........................... 712/227; 711/146; 714/34
(58) Field of Classification Search .................. 712/225, 712/227; 711/141, 146; 714/34
See application file for complete search history.

(56) References Cited

U.S. PATENT DOCUMENTS

| 5,680,620 A * | 10/1997 | Ross ............................. 717/129 |
| 5,838,897 A * | 11/1998 | Bluhm et al. ................... 714/30 |
| 6,292,906 B1 * | 9/2001 | Fu et al. ........................ 714/6.24 |
| 7,373,462 B2 * | 5/2008 | Blumrich et al. ............. 711/146 |
| 7,380,071 B2 * | 5/2008 | Blumrich et al. ............. 711/146 |
| 7,386,683 B2 * | 6/2008 | Blumrich et al. ............. 711/146 |
| 7,765,363 B2 * | 7/2010 | Gaither et al. ................ 711/146 |
| 2006/0294319 A1 * | 12/2006 | Mansell ........................ 711/146 |

FOREIGN PATENT DOCUMENTS

JP 06-332747 A 12/1994
JP 2009032264 A * 2/2009

OTHER PUBLICATIONS

Office Action from Chinese Patent Application No. CN200910134041.9 (and English translation).

* cited by examiner

Primary Examiner — Aimee Li
(74) Attorney, Agent, or Firm — Miles & Stockbridge P.C.

(57) ABSTRACT

An information processing device having a function for efficiently debugging a parallel processing program by controlling snoop operation is provided. The information processing device is so configured that the following is implemented: the setting for receiving a snoop request from a central processing unit can be set at a snoop controller that controls snoop operation; and as the result of reception of a snoop request, a debug controller can stop multiple central processing units.

13 Claims, 11 Drawing Sheets

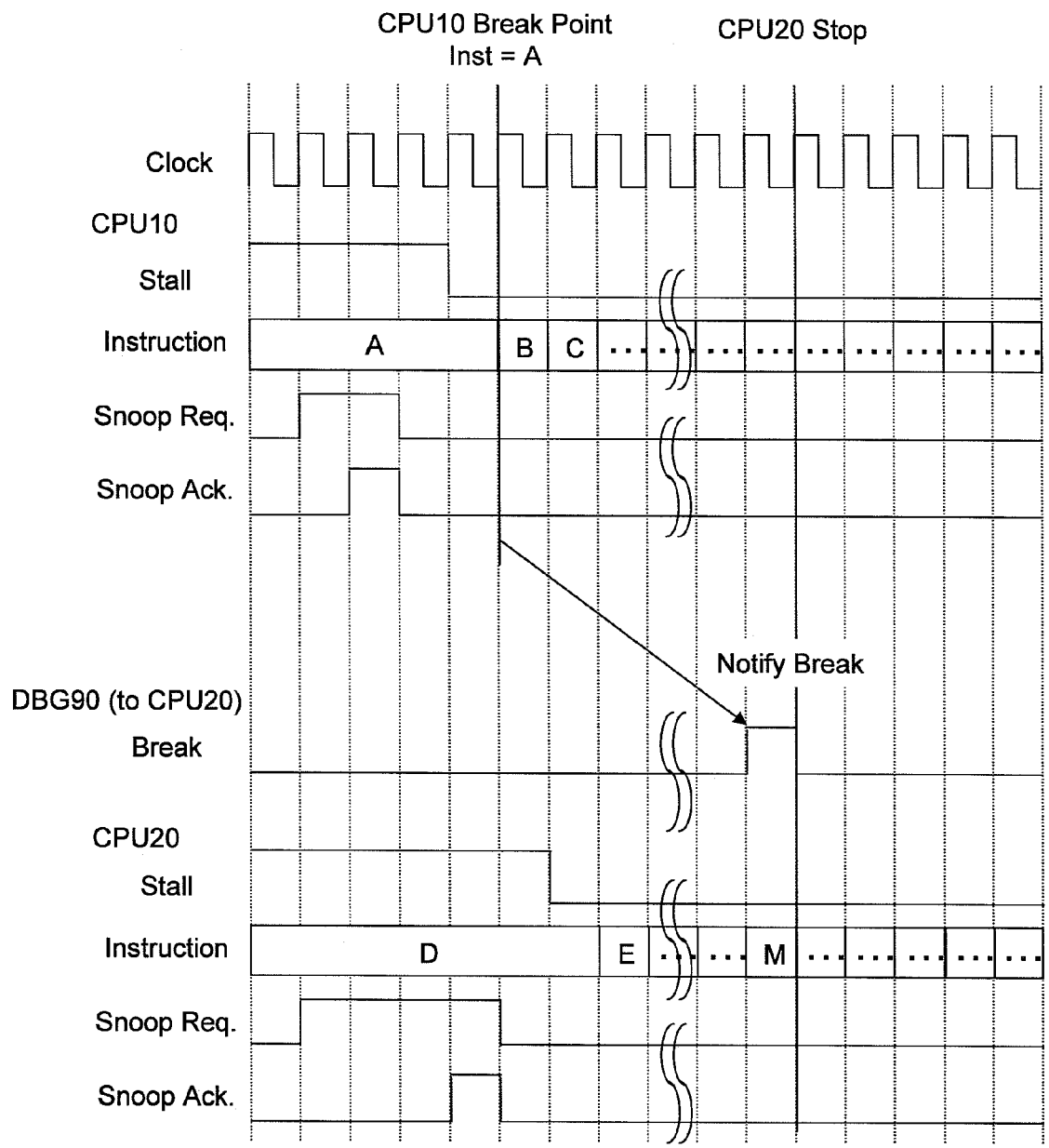

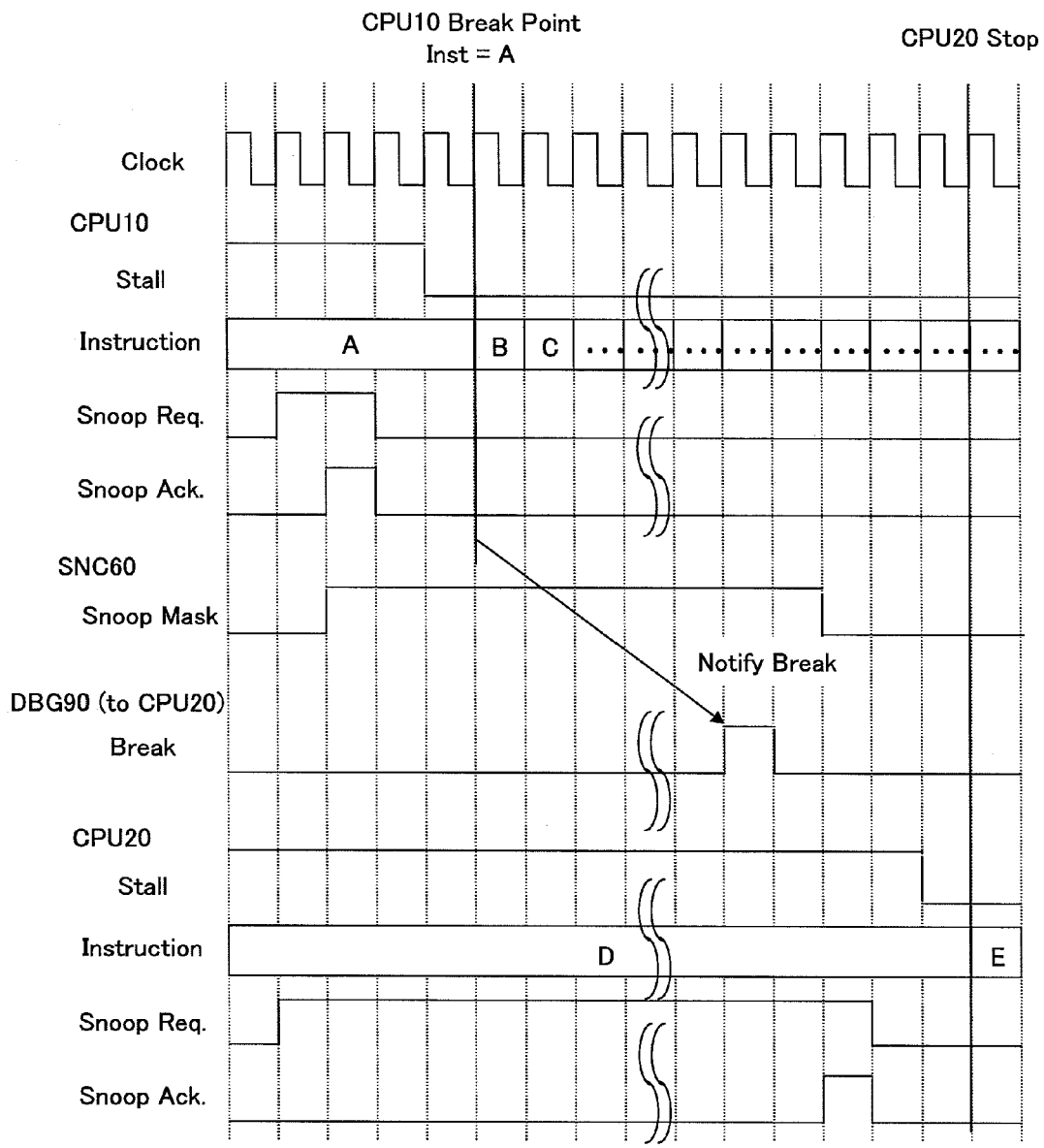

INFORMATION PROCESSING DEVICE

CLAIM OF PRIORITY

The present application claims priority from Japanese application JP 2008-100121 filed on Apr. 8, 2008, the content of which is hereby incorporated by reference into this application.

BACKGROUND OF THE INVENTION

1. Field of the Invention

The present invention relates to snoop operation in an information processing device.

2. Description of Related Art

In recent years, multi-core design in which multiple CPUs are incorporated in a processor has been a mainstream architecture of PCs and embedded devices. Conventionally, the enhancement of the performance of CPUs has been achieved by scaling and increase in the number of pipeline stages through process shrink to increase frequencies. At the 130 to 90-nm processes, however, the progress of scaling through process shrink was slowed down and the leakage power becomes very large in operation at enhanced frequency. Therefore, it has become difficult to apply the process shrink because of the restrictions of cooling cost and battery life. One of technologies for solving this problem is multi-core. In multi-core systems, the performance is enhanced by parallel processing of multiple CPUs and thus it is unnecessary to enhance frequencies and power consumption can be suppressed.

To enhance the efficiency of parallel processing by multi-core systems, it is required to maintain cache coherency. Usually, CPUs have a cache for accelerating instructions and data access. Writing to a cache by CPU is locally executed and the latest data does not exist in a memory and often exists only in a cache. Data may be shared between CPUs. When the latest data written to the cache of another CPU cannot be directly referred to, the following procedure must be taken: the CPU is interrupted and the latest data is written back to the memory and then it is cached again. This leads to significant degradation in performance. To cope with this, it is important to be capable of directly referring to the latest date written to the cache of another CPU (=the maintenance of cache coherency) in multi-core systems.

As protocols for maintaining the cache coherency, the MESI protocol and the MOESI protocol are known. In these protocols, snoop operation is defined. Snoop operation refers to a series of processing in which some CPU makes a request to another CPU as required when the cache thereof is updated and the requested CPU updates its own cache and sends back a response.

In parallel processing in multi-core systems, data is shared between CPUs and thus a large number of snoop operations are carried out. This makes it very difficult to debug programs. Usually, programs are debugged as follows: a break point is set and the CPU is stopped; and then the values of the cache, registers, and memory are checked to identify the cause of a bug. In multi-core systems, however, these values are updated by a program running on another CPU even though some CPU is stopped. One of conventional technologies for solving this problem is disclosed in Patent Document 1. In the technology disclosed in Patent Document 1, it can be chosen whether to stop only the CPU that caused the exception or all the CPUs at the time of a break point exception. The values of the cache, registers, and memory can be prevented from being thereafter updated by stopping all the CPUs.

[Patent Document 1] Japanese Unexamined Patent Publication No. Hei 6 (1994)-332747

When another CPU is stopped based on a break point exception caused in some CPU, it takes several cycles to several tens of cycles or so and the other CPU cannot be immediately stopped. This number of cycles depends on CPU or the implementation of a debug controller; however, there is a tendency that a larger number of cycles are required at a higher frequency. When a large number of snoop operations are carried out during this period, the state of a cache is updated by a snoop from another CPU even though the CPU for which a break point is set in a program is stopped. Even though an erroneous result is found in the cache after the CPU is stopped, it is difficult to identify when the bug slipped in. Therefore, it is desirable to provide a technology for efficiently debugging programs with respect to snoop operation in information processing devices.

SUMMARY OF THE INVENTION

With the foregoing taken into account, it is an object of the invention to provide an information processing device having a function of efficiently debugging programs for parallel processing in multi-core systems by holding any CPU other than a set CPU from executing snoop operation.

The following is a brief description of the gist of the representative elements of the invention laid open in this application: an information processing device is provided with: multiple CPUs having a cache for accelerating data access; a data memory accessible from the CPUs; a snoop controller having a cache for duplicating and storing part of the cache data of each of the CPUs; and a debug controller for debugging programs. This information processing device is so configured that the following is implemented: the CPUs carry out snoop requests and snoop operations for maintaining cache coherency; and the snoop controller receives snoop requests from the CPUs for maintaining cache coherency and identifies CPU requiring a snoop operation and carries out a snoop request.

The effect of the invention is that an information processing device having a function of efficiently debugging programs for parallel processing in a multi-core processor by holding any CPU other than a set CPU from executing a snoop operation can be provided.

BRIEF DESCRIPTION OF THE DRAWINGS

FIG. 17 is a timing chart illustrating parallel break executed when the embodiment of the invention is not applied; and FIG. 18 is a timing chart illustrating parallel break executed when the embodiment of the invention is applied.

DETAILED DESCRIPTION OF THE PREFERRED EMBODIMENTS

Embodiment

Hereafter, description will be given to an information processing device in a preferred embodiment of the invention with reference to the accompanying drawings. The circuit elements comprising each block in this embodiment are formed over a single semiconductor substrate of single crystal silicon or the like by a publicly known semiconductor integrated circuit technology for CMOSs (complementary MOS transistors), bipolar transistors, and the like. However, the invention is not specially limited to this.

Figure 1:
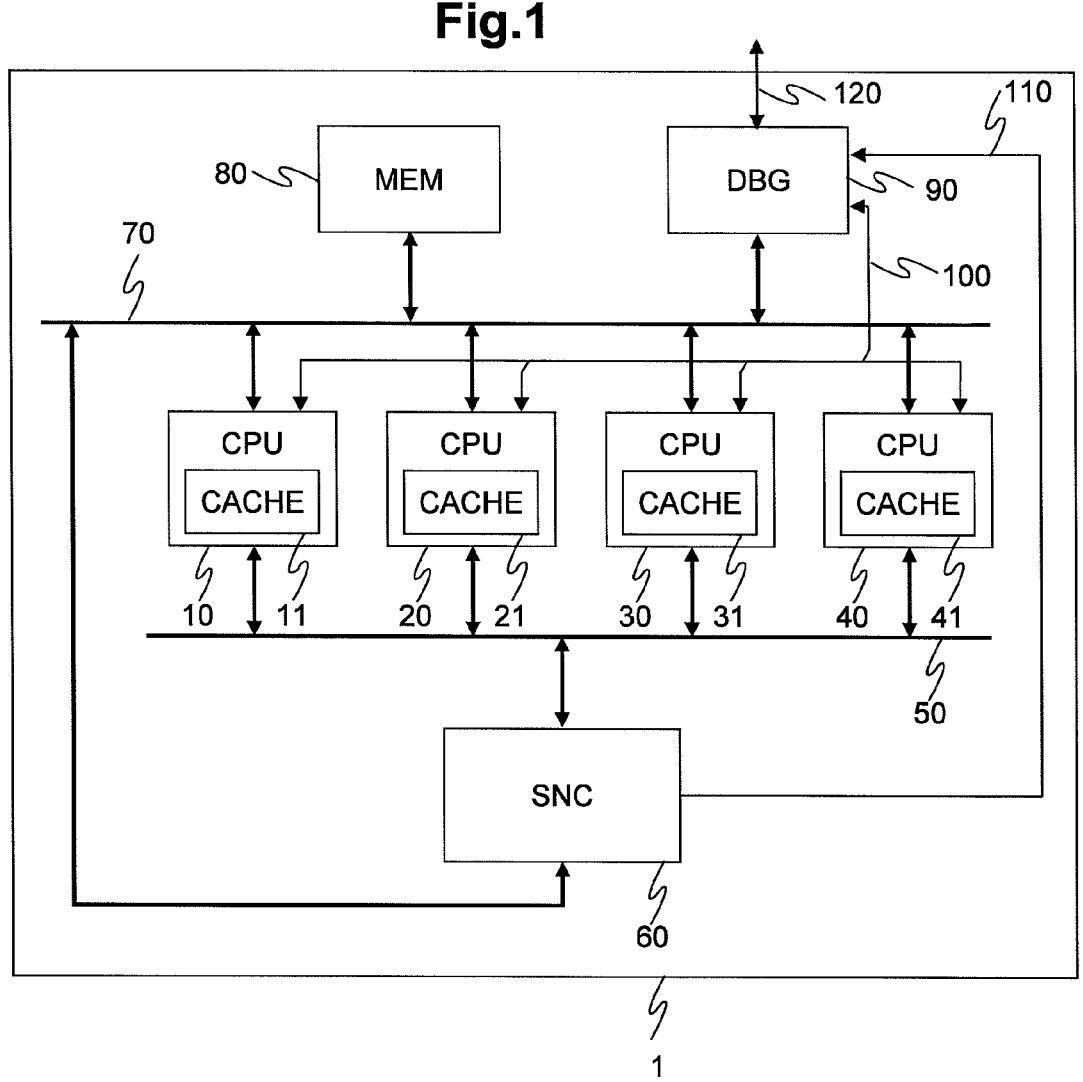
FIG. 1 is a block diagram of an information processing device in an embodiment of the invention.

FIG. 1 illustrates a multi-core system based on an information processing device in the embodiment of the invention. This multi-core system is integrated over an IC chip 1 and is comprised of: central processing units (CPUs) 10, 20, 30, 40, a snoop bus 50, a snoop controller (SNC) 60, a bus 70, a shared memory (MEM) 80, a debug controller (DBG) 90, and the like.

The central processing units (CPUs) 10, 20, 30, 40 are general-purpose circuits that read and interpret programs present in the shared memory (MEM) 80 and carry out the transfer of data, arithmetic operations, logical operation, and the like according to the result of reading and interpretation. The central processing units (CPUs) 10, 20, 30, 40 respectively have caches 11, 21, 31, 41. Each cache holds a valid bit, a dirty bit, a shared bit, a tag, and data. The valid bit, dirty bit, and shared bit respectively indicate whether or not a cache entry is valid, whether or not writing has occurred, and whether or not data is shared between the relevant cache and the cache of another central processing unit. These three bits indicate the state of each cache in the MESI protocol. The tag is part of a physical address and is used for cache hit determination. The MESI protocol will be described later with reference to FIG. 6.

The snoop bus 50 is a dedicated bus for accelerating snoop operations between the central processing units (CPUs) 10, 20, 30, 40 and the snoop controller (SNC) 60. The snoop bus transfers data independently from the bus 70 coupling the central processing units (CPUs) 10, 20, 30, 40, shared memory (MEM) 80, and the like and does not interfere with data transfer with the memory, a peripheral logic, or the like.

The snoop controller (SNC) 60 controls updating of the caches among the central processing units (CPUs) 10, 20, 30, 40 and thereby maintains the coherency of the caches. The snoop operation for maintaining the coherency of caches will be described in detail later.

The bus 70 is a general-purpose bus to which the central processing units (CPUs) 10, 20, 30, 40, snoop controller (SNC) 60, debug controller (DBG) 90, shared memory (MEM) 80, peripheral logic, and the like are coupled. The central processing units (CPUs) 10, 20, 30, 40 are coupled to one another and the shared memory (MEM) 80 through the bus 70 and are coupled to the snoop controller (SNC) 60 through the snoop bus 50.

The shared memory (MEM) 80 is such a main storage as SRAM and DRAM and holds instructions and data required for processing by the central processing units (CPUs) 10, 20, 30, 40.

The debug controller (DBG) 90 accesses the following resources by data communication through an emulator external to the chip and wiring 120: the internal registers of the debug controller (DBG) 90, the internal registers, cache, and embedded memory of each central processing unit, the internal registers of the snoop controller (SNC) 60, the shared memory (MEM) 80, and the peripheral logic. Further, the debug controller can provide instructions to stop and restart the central processing units (CPUs) 10, 20, 30, 40 through wiring 100.

Figure 2:
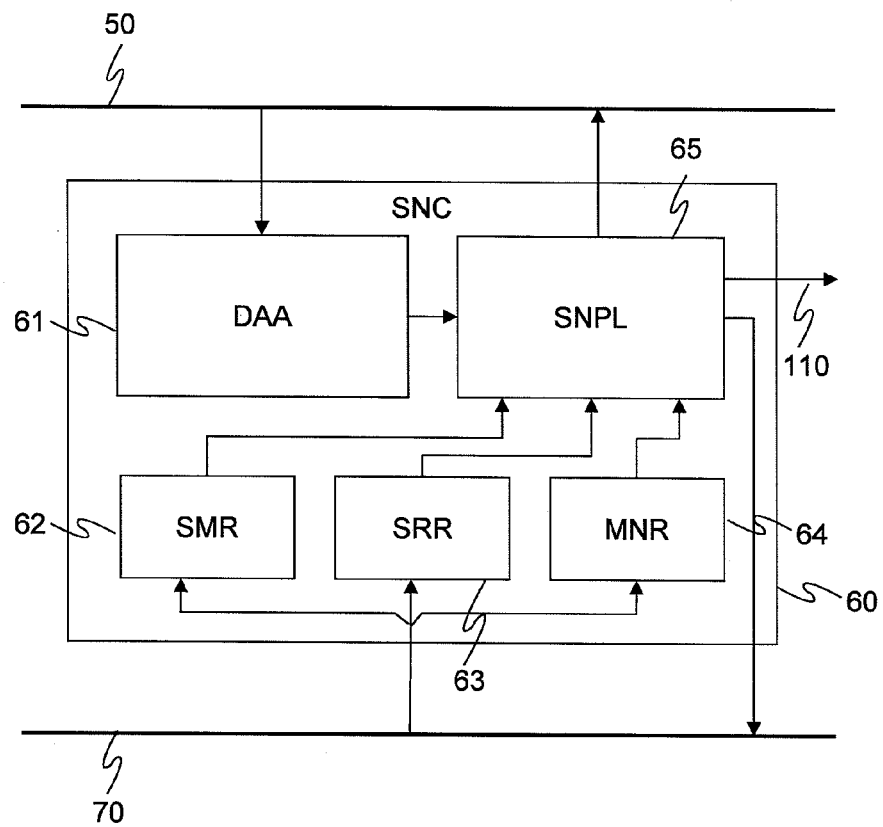
FIG. 2 is a drawing illustrating the details of a snoop controller (SNC)

FIG. 2 illustrates the details of the snoop controller (SNC) 60. The snoop controller (SNC) 60 is comprised of: a duplicated address array (DAA) 61, a snoop mask register (SMR) 62, a snoop release register (SRR) 63, a condition match notification register (MNR) 64, and a snoop control logic (SNPL) 65.

The snoop controller searches the duplicated address array (DAA) 61 according to a snoop request from each central processing unit and snoops another central processing unit based on the search result. The snoop controller (SNC) 60 is coupled to the shared memory (MEM) 80 through the bus 70. To write the result of a snoop operation and data back to the shared memory (MEM) 80, this path is used.

The snoop mask register (SMR) 62 holds a condition for the snoop controller (SNC) 60 to lock a snoop from another central processing unit.

The snoop release register (SRR) 63 holds the state of whether or not a snoop is locked.

The condition match notification register (MNR) 64 holds the setting specifying whether or not the debug controller (DBG) 90 should be notified when a snoop from another central processing unit is locked.

The snoop control logic (SNPL) 65 performs the following operations: it carries out the control of snoop operation described later and snoop mask control based on the setting on the snoop mask register (SMR) 62; and it notifies the debug controller (DBG) 90 of condition match through wiring 110 based on the setting on the condition match notification register (MNR) 64.

Figure 3:
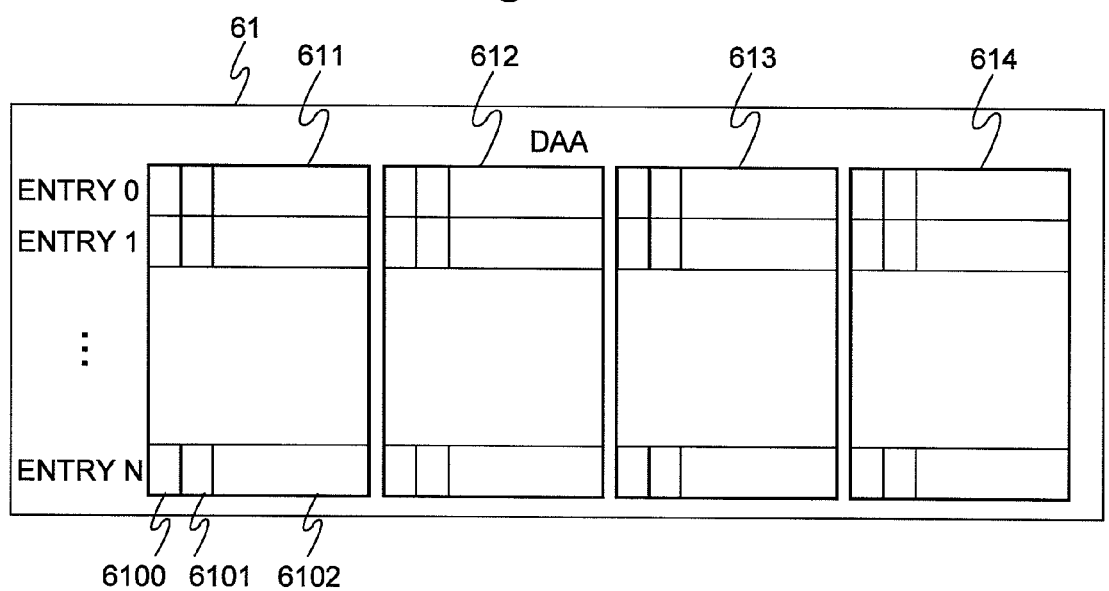
FIG. 3 is a drawing illustrating the details of the duplicated address array (DAA) in the snoop controller (SNC)

FIG. 3 illustrates the details of the duplicated address array (DAA) 61 in the snoop controller (SNC) 60 illustrated in FIG. 1. The duplicated address array (DAA) 61 has duplicated addresses 611, 612, 613, 614 corresponding to the caches 11, 21, 31, 41 of the individual central processing units. Of the cache information of each central processing unit, valid bits 6100, shared bits 6101, and tags 6102 are held at the corresponding duplicated addresses.

Figure 4:
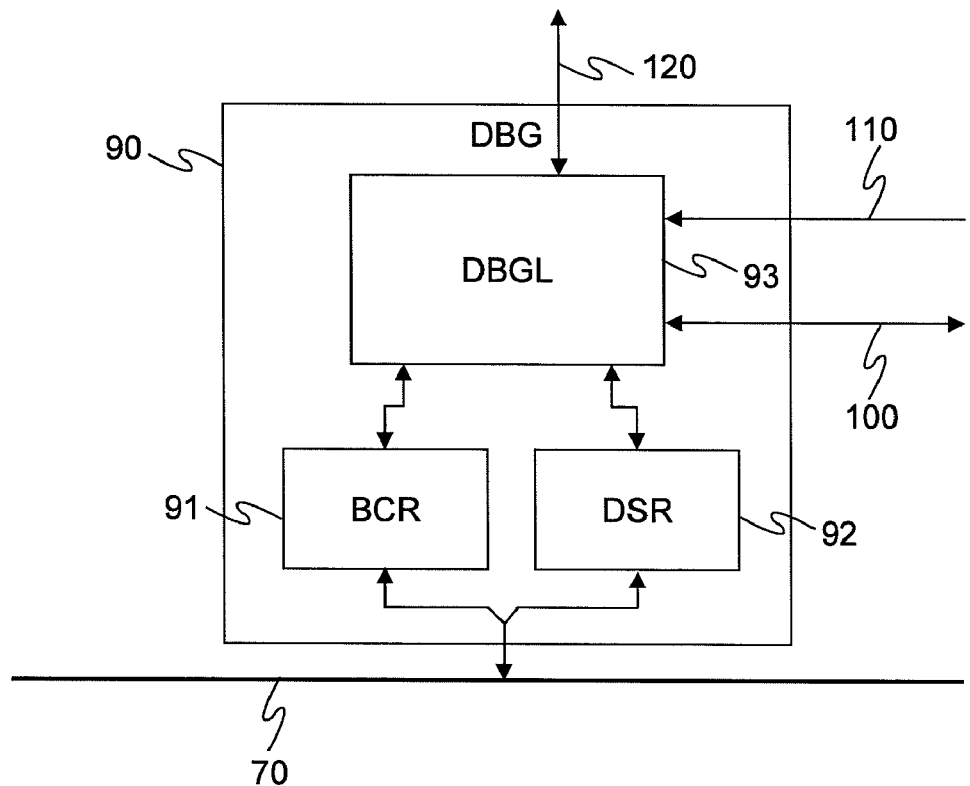
FIG. 4 is a drawing illustrating the details of a debug controller (DBG)

FIG. 4 illustrates the details of the debug controller (DBG) 90 illustrated in FIG. 2. The debug controller (DBG) 90 is comprised of a break condition register (BCR) 91, a debug status register (DSR) 92, and a debug control logic (DBGL) 93.

The break condition register (BCR) 91 holds conditions for causing the central processing units (CPUs) 10, 20, 30, 40 to cause a break point exception.

The debug status register (DSR) 92 holds the status of whether or not a break point exception has occurred.

The debug control logic (DBGL) 93 controls access to a resource internal to the chip based on an instruction from an emulator external to the chip. It controls the occurrence of a break point exception based on the setting on the break condition register (BCR) 91, the states of the central processing units (CPUs) 10, 20, 30, 40, and condition match notification from the snoop controller. When a break point exception occurs, the debug control logic makes a stop request to the central processing units (CPUs) 10, 20, 30, 40 via the wiring 100 and carries out writing to the debug status register (DSR) 92.

Figure 5:
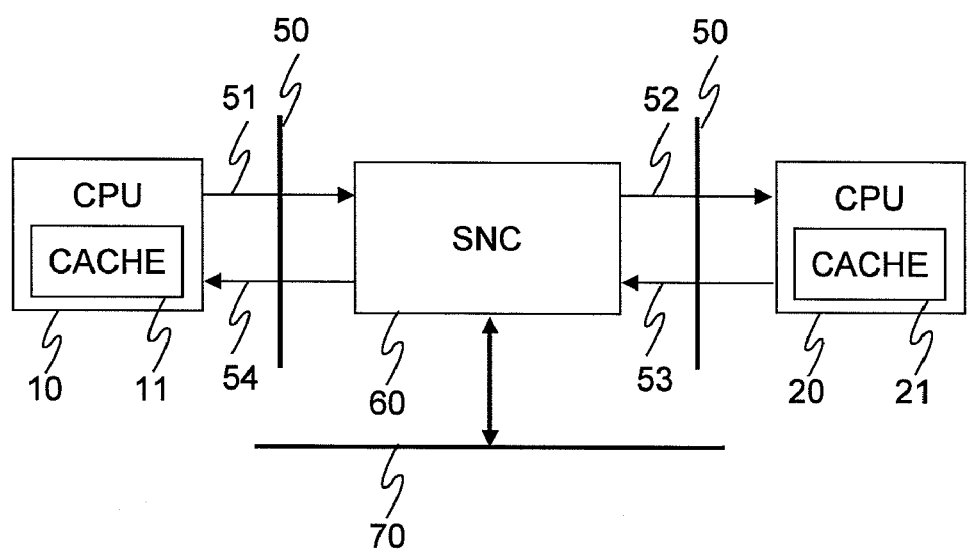
FIG. 5 is a drawing illustrating the transfer of signals in a snoop operation.

FIG. 5 illustrates the transfer of signals in snoop operation. In snoop operation, the following series of processing is carried out. First, when a central processing unit (CPU) 10 updates the cache 11, it makes a snoop request 51 to the snoop controller (SNC) 60 for maintaining the coherency of data between the cache thereof and the cache 21 of a central processing unit (CPU) 20. In the series of processing according to a snoop request, fill and write back are executed in addition to the updating of a cache. Therefore, the snoop request 51 contains such commands as read and write, the address of the target of access in the shared memory (MEM) 80, write data, and the like. On receipt of the snoop request 51, the snoop controller (SNC) 60 searches and updates the duplicated address array (DAA) 61 and further makes a request 52 to update the state of the cache 21 to the central processing unit (CPU) 20. On receipt of the state update request 52, the central processing unit (CPU) 20 updates the cache 21 and the results of these requests are notified as responses 53, 54. When the result of searching the duplicated address array (DAA) 61 reveals that there is no valid data in the cache 21, the snoop controller (SNC) 60 accesses the shared memory (MEM) 80 through the bus 70 and gives the response 54 to the central processing unit (CPU) 10.

Figure 6:
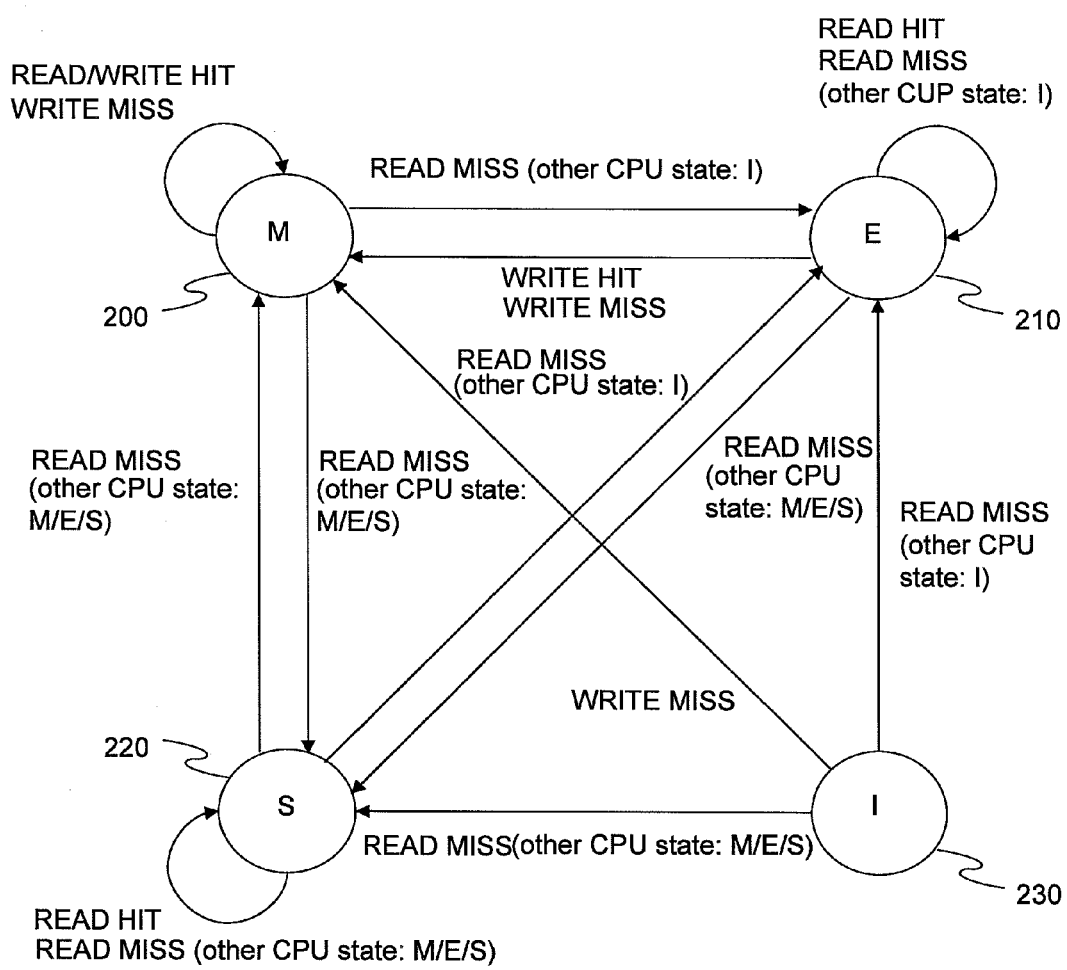
FIG. 6 is a drawing illustrating the MESI protocol for maintaining cache coherency.

FIG. 6 illustrates the MESI (Modified Exclusive Shared Invalid) protocol. The MESI protocol is used for snoop operation. The MESI protocol is a protocol for maintaining the coherency between caches and each cache takes the following four states:

(1) M state (Modified State): some data exists only in the cache of some central processing unit and is modified from a value in the main storage. When another central processing unit accesses data corresponding to this cache line in the main storage, control must be carried out so that it can refer to the modified latest value.

(2) E state (Exclusive State): some data exists only in the cache of some central processing unit but it agrees with a value in the main storage.

(3) S state (Shared State): an identical cache line exists in multiple central processing units and agrees with a value in the main storage.

4) I state (Invalid State): data does not exist in any cache.

In the following description, the E' state is also used. The E' state means the state of a cache indicating the E state 210 or the M state 200 though not shown in FIG. 6. The reason for this is as follows: the duplicated address array (DAA) 61 does not discriminate the M state and the E state from each other and thus use of the E' state is convenient. The duplicated address array (DAA) may be so configured that the M state and the E state are discriminated from each other, needless to add.

Description will be given to actions carried out in snoop operation by the central processing units (CPUs) 10, 20, 30, 40 and the snoop controller (SNC) 60. It will be assumed that the MESI protocol illustrated in FIG. 6 is used for snoop operation though the invention is not specially limited to this. In this example, read and write are executed and the central processing unit (CPU) 10 is selected as the source of snoop operation request and the central processing unit (CPU) 20 is selected as the target of snoop operation request. However, there is no limitation on the combination of central processing units. First, description will be given to a case where read is executed. When read is executed at the central processing unit (CPU) 10 and a cache miss occurs, a snoop request is made to refer to the latest data in the caches 21, 31, 41 of the central processing units (CPUs) 20, 30, 40. At this time, the command is read and the address is the address in the shared memory (MEM) 80 at which the cache miss has occurred. The snoop request is given to the snoop controller (SNC) 60 through the snoop bus 50. The snoop controller (SNC) 60 searches the duplicated address array (DAA) 61 and checks whether or not the latest data exists in the caches 21, 31, 41.

When the result of searching the duplicated address array (DAA) 61 reveals that the latest data does not exist in the cache 21, 31, or 41, the following processing is carried out: the snoop controller (SNC) 60 updates the state of an entry in the duplicated address array (DAA) 61 corresponding to the relevant entry in the cache 11 from the I state 230 to the E' state; and then the snoop controller returns a response indicating that the latest data was not found in the caches of the other central processing units to the central processing unit (CPU) 10. On receipt of the response, the central processing unit (CPU) 10 modifies the state of the relevant entry in the cache 11 from the I state 230 to the E state 210. Since the latest data exists in the shared memory (MEM) 80, it is written to the cache 11 of the central processing unit (CPU) 10 through the bus 70 or the snoop controller (SNC) 60 and the snoop bus 50.

When the result of searching the duplicated address array (DAA) 61 reveals that the latest data exists in, for example, the cache 21, the following processing is carried out: the snoop controller (SNC) 60 updates the state of an entry in the duplicated address array (DAA) 61 corresponding to the relevant entry in the cache 11 from the I state 230 to the S state 220; in addition, the snoop controller updates the state of an entry in the duplicated address array (DAA) 61 corresponding to the relevant entry in the cache 21 from the E' state/S state 220 to the S state 220; further, the snoop controller returns a response indicating that the latest data was found in the cache of another central processing unit to the central processing unit (CPU) 10 through the snoop bus 50; and it requests the central processing unit 20 to update the state of the cache and transfer the latest data. On receipt of the response, the central processing unit (CPU) 10 updates the state of the relevant entry in the cache 11 from the I state 230 to the S state 220. On receipt of the request, the central processing unit 20 updates the state of the relevant entry in the cache 21 from the M state 200/E state 210/S state 220 to the S state 220 and returns the latest data to the snoop controller (SNC) 60. The snoop controller (SNC) 60 returns the latest data to the central processing unit (CPU) 10 and the data is written to the cache 11.

When read is executed at the central processing unit (CPU) 10 and a cache hit occurs, the latest data exists in the cache 11 and thus a snoop is not carried out.

Description will be given to a case where write is executed. When write is executed at the central processing unit (CPU) 10 and a cache miss occurs, a snoop request is made to refer to the latest data in the caches 21, 31, 41 of the central processing units (CPUs) 20, 30, 40. At this time, the command is write and the address is the address in the shared memory (MEM) 80 at which the cache miss has occurred. When the command is write, the write data is also outputted. The snoop request is given to the snoop controller (SNC) 60 through the snoop bus 50. The snoop controller (SNC) 60 searches the duplicated address array (DAA) 61 to check whether or not the latest data exists in the caches 21, 31, 41.

When the result of searching the duplicated address array (DAA) 61 reveals that the latest data does not exist in the cache 21, 31, or 41, the following processing is carried out: the snoop controller (SNC) 60 updates the state of an entry in the duplicated address array (DAA) 61 corresponding to the relevant entry in the cache 11 from the I state 230 to the E' state; and the snoop controller returns a response to the central processing unit (CPU) 10. On receipt of the response, the central processing unit (CPU) 10 modifies the state of the relevant entry in the cache 11 from the I state 230 to the M state 200. Since the latest data prior to the execution of write exists in the shared memory (MEM) 80, it is written to the cache 11 of the central processing unit (CPU) 10 through the bus 70 or the snoop controller (SNC) 60 and the snoop bus 50.

When the result of searching the duplicated address array (DAA) 61 reveals that the latest data exists in, for example, the cache 21, the following processing is carried out: the snoop controller (SNC) 60 updates the state of an entry in the duplicated address array 61 corresponding to the relevant entry in the cache 11 from the I state 230 to the E' state; in addition, the snoop controller updates the state of an entry in the duplicated address array (DAA) 61 corresponding to the relevant entry in the cache 21 from the M state 200/E state 210/S state 220 to the I state 230; and further, the snoop controller returns a response to the central processing unit (CPU) 10 through the snoop bus 50 and requests the central processing unit 20 to update the state of the cache and transfer the latest data. On receipt of the response, the central processing unit (CPU) 10 updates the state of the relevant entry in the cache 11 from the I state 230 to the M state 200. On receipt of the request, the central processing unit 20 updates the state of the relevant entry in the cache 21 from the M state 200/E state 210/S state 220 to the I state 230. Then it returns the latest data to the snoop controller (SNC) 60. The snoop controller 60 returns the latest data to the central processing unit (CPU) 10 and the data is written to the cache 11.

When write is executed at the central processing unit (CPU) 10 and a cache hit occurs in the M state 200/E state 210, the latest data exists only in the cache 11 and thus a snoop is not carried out.

When write is executed at the central processing unit (CPU) 10 and a cache hit occurs in the S state 220, a snoop request is made to notify that the data existing in the caches of the other central processing units is not latest anymore. The snoop request is given to the snoop controller (SNC) 60 through the snoop bus 50. The snoop controller (SNC) 60 searches the duplicated address array (DAA) 61 and checks whether or not the latest data exists in the caches 21, 31, 41.

When the result of searching the duplicated address array (DAA) 61 reveals that the latest data does not exist in the cache 21, 31, or 41, the following processing is carried out: the snoop controller (SNC) 60 updates the state of an entry in the duplicated address array (DAA) 61 corresponding to the relevant entry in the cache 11 from the S state 220 to the E' state; and then the snoop controller returns a response to the central processing unit (CPU) 10. On receipt of the response, the central processing unit (CPU) 10 modifies the state of the relevant entry in the cache 11 from the S state 220 to the M state 200.

When the result of searching the duplicated address array (DAA) 61 reveals that the latest data exists in, for example, the cache 21, the following processing is carried out: the snoop controller (SNC) 60 updates the state of an entry in the duplicated address array (DAA) 61 corresponding to the relevant entry in the cache 11 from the S state 220 to the E' state; in addition, the snoop controller updates the state of an entry in the duplicated address array (DAA) 61 corresponding to the relevant entry in the cache 21 from the S state 220 to the I state 230; and further, the snoop controller returns a response to the central processing unit (CPU) 10 through the snoop bus 50 and requests the central processing unit (CPU) 20 to update the state of the cache and transfer the latest data. On receipt of the response, the central processing unit (CPU) 10 updates the state of the relevant entry in the cache 11 from the S state 220 to the M state 200. On receipt of the request, the central processing unit 20 updates the state of the relevant entry in the cache 21 from the S state 220 to the I state 230.

As mentioned above, all the steps of a series of snoop operation are carried out through the snoop controller (SNC) 60. For this reason, the following measure is taken. When a snoop request is received from the central processing units (CPUs) 10, 20, 30, 40, a match with a mask condition in the snoop mask register (SMR) 62 is determined. Receive of the other snoop requests from central processing units than that from a central processing unit placed in the snoop controller (SNC) 60 is temporarily masked. Thus the state of the cache of that central processing unit can be prevented from being updated by the other central processing units.

Figure 7:
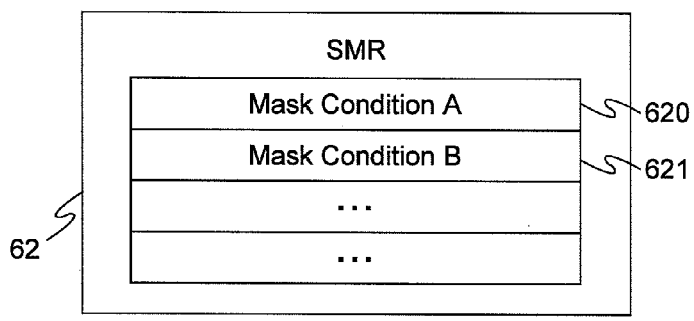
FIG. 7 is a drawing illustrating the details of the snoop mask register (SMR) 62 in the snoop controller (SNC)
Figure 8:
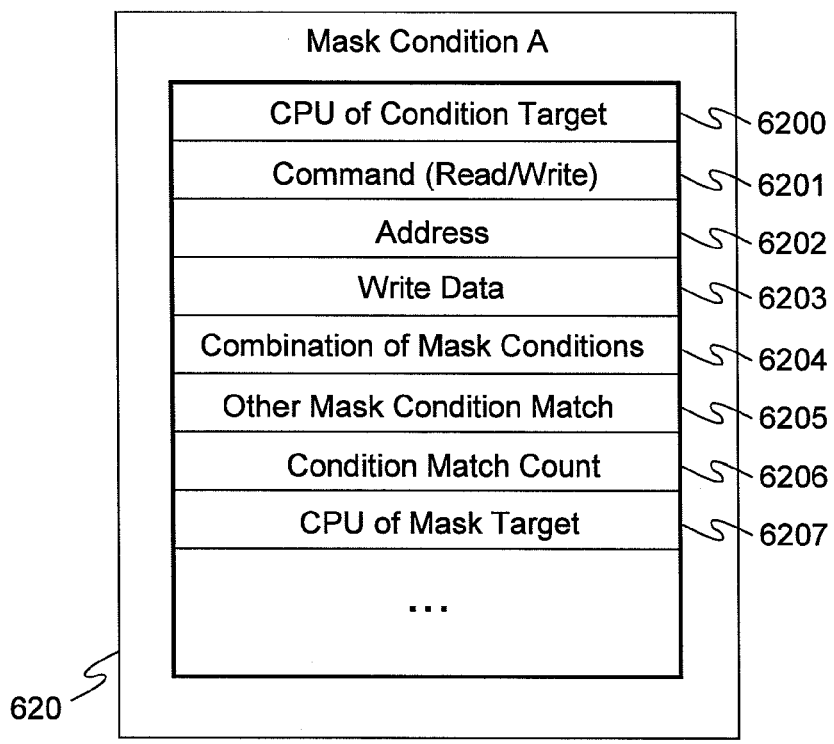
FIG. 8 is a drawing illustrating a mask condition set on the snoop mask register (SMR)
Figure 9:
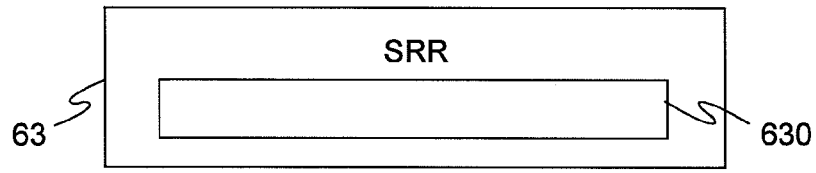
FIG. 9 is a drawing illustrating the details of the snoop release register (SRR) in the snoop controller (SNC)
Figure 10:
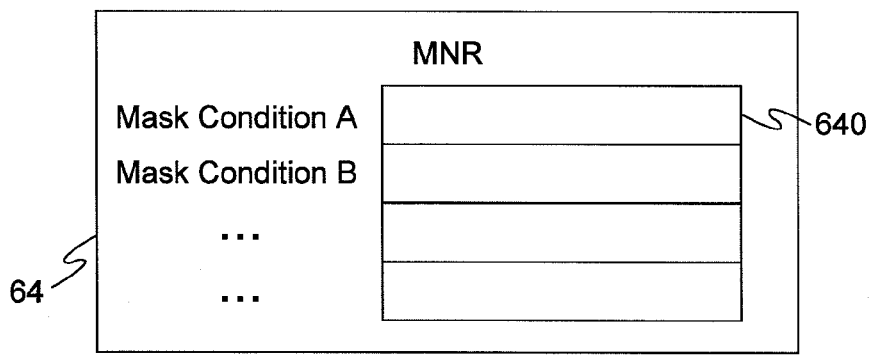
FIG. 10 is a drawing illustrating the details of the condition match notification register (MNR) in the snoop controller (SNC)
Figure 11:
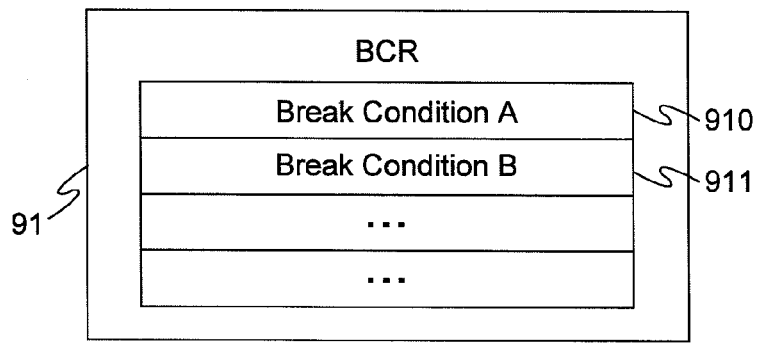
FIG. 11 is a drawing illustrating the details of the break condition register (BCR) in a debug controller (DBG)
Figure 12:
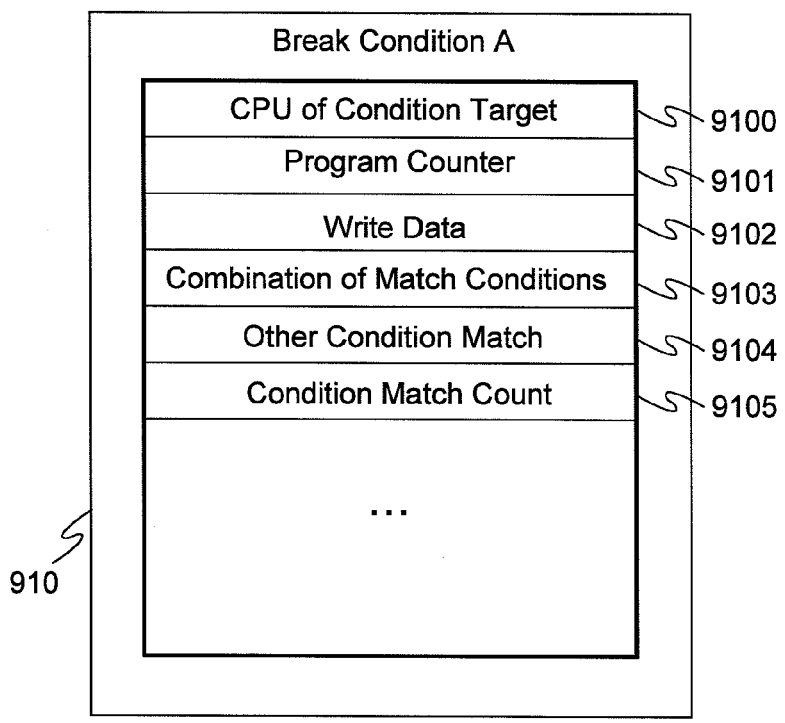
FIG. 12 is a drawing illustrating a break condition set on the break condition register (BCR)
Figure 13:
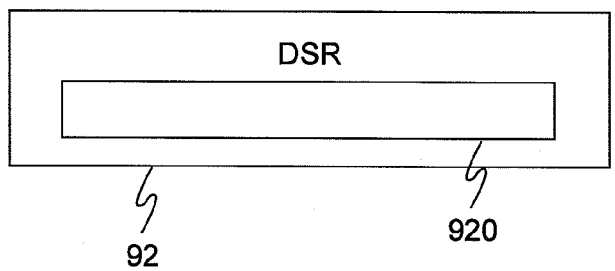
FIG. 13 is a drawing illustrating the details of the debug status register (DSR) in the debug controller (DBG)

To make this more understandable, detailed description will be given to the snoop controller (SNC) 60 and the debug controller (DBG) 90. FIGS. 7 and 8 illustrate the snoop mask register (SMR) 62; FIG. 9 illustrates the snoop release register (SRR) 63; and FIG. 10 illustrates the condition match notification register (MNR) 64. FIGS. 11 and 12 illustrate the break condition register (BCR) 91 and FIG. 13 illustrates the debug status register (DSR) 92. After the description of these registers, description will be given to a method for facilitating debugging of parallel processing programs in multi-core systems, excepting a mask against the receive of a snoop request and the removal of the mask, with reference to FIG. 14.

FIG. 7 illustrates the details of the snoop mask register (SMR) 62 in the snoop controller (SNC) 60 illustrated in FIG. 2. On the snoop mask register (SNR) 62, multiple mask conditions, such as mask condition A 620, mask condition B 621, . . . can be set.

FIG. 8 illustrates a mask condition set on the snoop mask register (SMR) 62. For the mask condition A 620, mask condition B 621, . . . , a central processing unit of condition target 6200, a command 6201, an address 6202, write data 6203 can be set to use the conditions as criteria. The snoop controller (SNC) 60 monitors a snoop request (command, address, write data) from the central processing unit specified by the setting of the central processing unit of condition target 6200. Then the snoop controller determines a match/mismatch with the processing descriptors of the command 6201, address 6202, and write data 6203.

In the following description, the mask condition A 620 will be taken as an example but the foregoing is the same with other mask conditions. For match determination, a combination of one or more of these mask conditions in logical addition or logical multiplication is selected according to the setting of combination of mask conditions 6204. In addition, a combination of multiple mask condition matches 6205 or a condition match count 6206 may be selected as a match determination condition. When a match determination is made, the snoop controller (SNC) 60 thereafter does not receive a snoop request from any central processing unit other than the central processing unit that made the snoop request. The invention may be so configured that a central processing unit whose snoop request is not received 6207 can be set for the mask condition A 620. In this case, control is carried out so that a snoop request from that central processing unit (CPU) is not received according to this setting.

FIG. 9 illustrates the details of the snoop release register (SRR) 63 in the snoop controller (SNC) 60 illustrated in FIG. 2. The snoop release register (SRR) 63 indicates the state of whether or not a snoop request is masked by a specifier 630. To mask a snoop request, 1 is set and the masked state of a snoop request can be removed by writing in 0.

FIG. 10 illustrates the details of the condition match notification register (MNR) 64 in the snoop controller (SNC) 60 illustrated in FIG. 2. The condition match notification register (MNR) 64 holds the setting 640 specifying whether or not the debug controller (DBG) 90 should be notified when a snoop request to another central processing unit is masked. 0 specifies that the debug controller should not be notified and 1 specifies that it should be notified. This setting of notification 640 is made for each mask condition in the snoop mask register (SMR) 62. Detailed description will be given with reference to FIGS. 14 and 15. Whether or not a break point exception should be caused at the debug controller when a snoop is locked can be specified by making the setting of notification 640 on the condition match notification register.

FIG. 11 illustrates the details of the break condition register (BCR) 91 in the debug controller (DBG) 90 illustrated in FIG. 4. On the break condition register (BCR) 91, multiple break conditions such as break condition A 910, break condition B 911, . . . can be set.

FIG. 12 illustrates break conditions set on the break condition register (BCR) 91. For the break condition A 910, break condition B 911, . . . , a central processing unit of condition target 9100, program counter count 9101, and write data 9102 can be set to use the conditions as criteria. The debug module (DBG) 90 monitors the value of the program counter and write data of the central processing unit specified by the setting of central processing unit of condition target 9100. Then it determines a match/mismatch with the processing descriptors of the program counter value 9101 and the write data 9102. The processing descriptor of central processing unit of condition target 9100 is unnecessary in the following cases: cases where the debug controller (DBG) 90 is divided on a central processing unit (CPU) by central processing unit (CPU) basis; and cases where a register is provided for each central processing unit (CPU).

In the following description, the break condition A 910 will be taken as an example but the foregoing is the same with other break conditions. For match determination, a combination of one or more of the above-mentioned break conditions in logical OR or logical AND is selected according to the setting of combination of break conditions 9103. In addition, a combination of multiple break conditions 9104 or a condition match count 9105' may be selected as a match determination condition. When a match determination is made, a break point exception occurs. Break point exception refers to the following processing: when a program running on a central processing unit (CPU) meets a break condition, the debug controller (DBG) 90 requests the central processing unit (CPU) to stop the execution of the program. In break point exception, a request to stop execution only has to be able to be made to at least a central processing unit (CPU) meeting a break condition. Or, the debug controller (DBG) 90 may be so configured as to simultaneously request the other central processing units (CPU) to stop execution.

FIG. 13 illustrates the details of the debug status register (DSR) 92 in the debug controller (DBG) 90 illustrated in FIG. 4. The debug status register (DSR) 92 indicates whether or not a break point exception has occurred by a specifier 920. 0 indicates the state in which a break point exception has not occurred and 1 indicates the state in which it has occurred.

Figure 14:
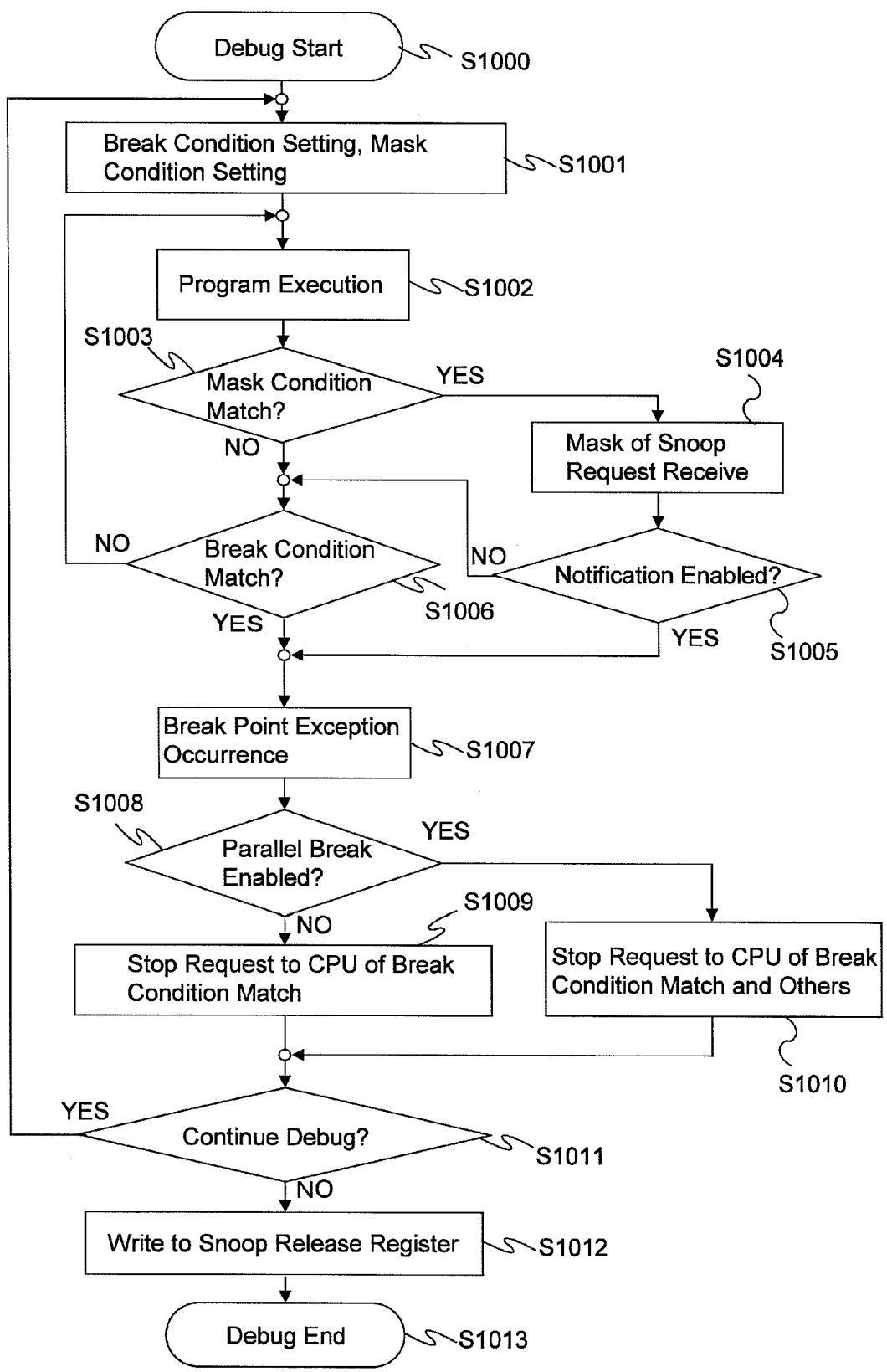
FIG. 14 is a flowchart illustrating a debug flow in the embodiment of the invention.
Figure 15:
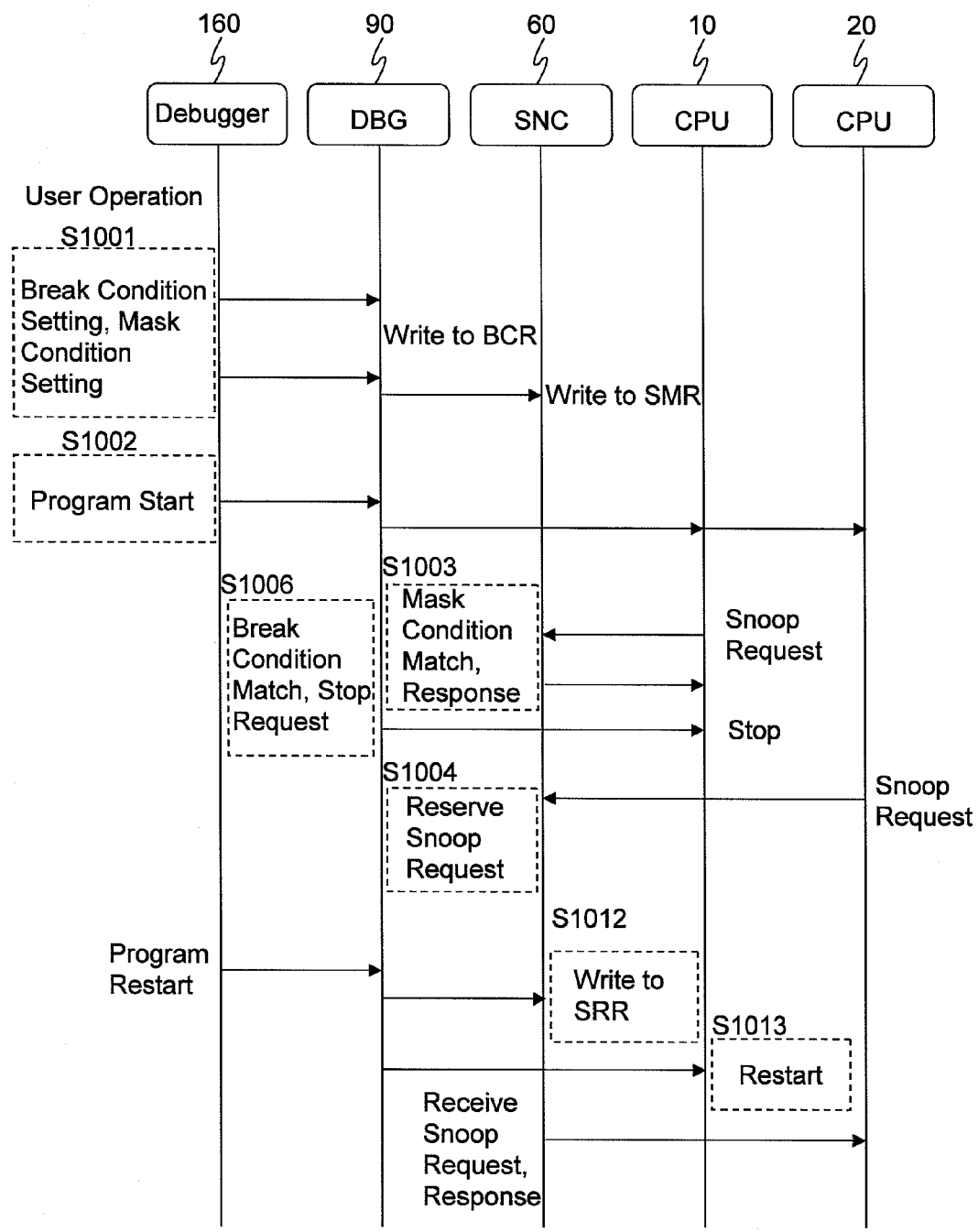
FIG. 15 is a drawing illustrating the flow of processing in each module in FIG. 14.

FIG. 14 is a flowchart of debugging and FIG. 15 illustrates the sequence of processing by each module. It will be assumed that: the CPU core as the target of a mask condition in the snoop mask register (SMR) 62 is the central processing unit (CPU) 10 and the CPU core to be masked is the central processing unit (CPU) 20. Debugging of a parallel processing program in a multi-core system is carried out by combining a mask of snoop request receive and stopping of a central processing unit by a break point exception.

Figure 16:
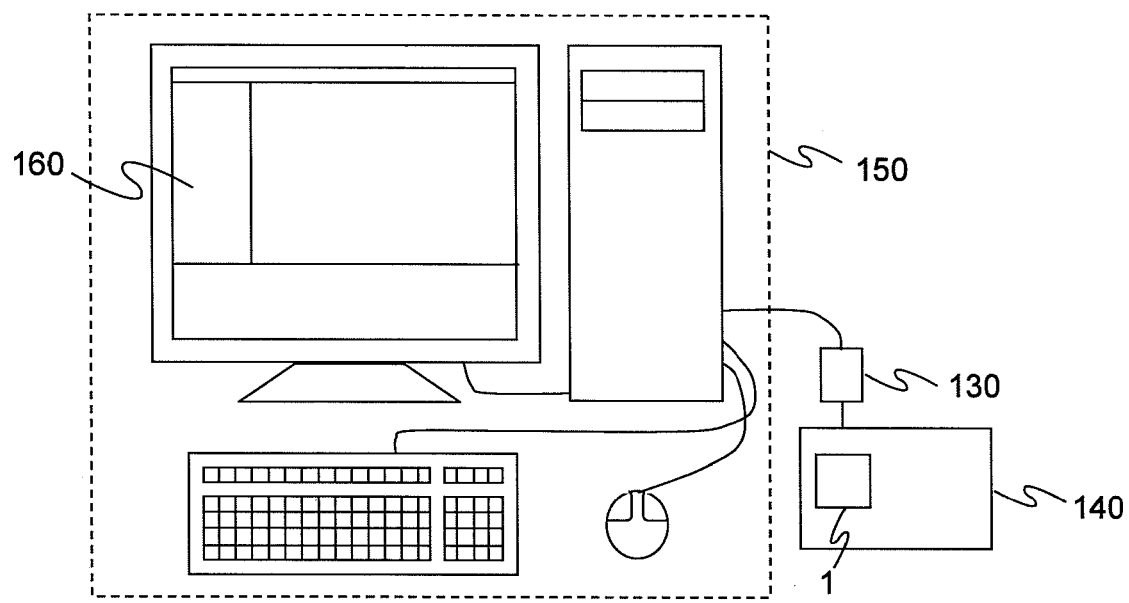
FIG. 16 is a drawing illustrating an environment for debugging.

First, a break condition and a mask condition for snoop requests are simultaneously set on the debug controller (DBG) 90 from a debugger 160 (S1001). The setting methods for these conditions will be described with reference to FIG. 16. An IC chip 1 subjected to debugging is coupled to a board 140 for development and is coupled with a development environment 150 such as PC and WS through an emulator 130. In the development environment 150, the debugger 160 operates and user operation with the debugger 160 is notified to the debug controller (DBG) 90 in the IC chip 1. When a user sets a break point in a program in the shared memory (MEM) 80 with the debugger 160, the debug controller (DBG) 90 notified thereof carries out wiring to the break condition register (BCR) 91 through the bus 70. The setting of a break condition is thereby made. The setting of a receive mask is made similarly with the foregoing. That is, user operation is notified to the debug controller (DBG) 90 and writing to the snoop mask register (SMR) 62 is carried out. The setting of a receive mask is thereby made.

After these registers are set, the execution of the program is started at each central processing unit by user operation with the debugger 160 through the debug controller (DBG) 90 (S1002). If, for example, a read miss occurs while the program is running, a match determination for the mask condition for snoop requests is carried out when a snoop request is made to start the above-mentioned snoop operation (S1003). This match determination is carried out based on whether or not the command, such as read or write, contained in the snoop request, the address of a target of access in the shared memory (MEM) 80, and the write data match with the mask condition. When the snoop request matches with the mask condition, the snoop controller (SNC) 60 does not receive snoop requests from the other central processing units anymore (S1004). When the snoop request does not match with the mask condition, snoop requests are received as before.

Description will be given to mask condition match and masks against snoop requests with a concrete example cited. It will be assumed that the CPU core to which the mask condition A 620 in the snoop mask register (SMR) 62 is applied is the central processing unit (CPU) 10; the command is read; the address is 0x01234567; the combination of mask conditions is command and address; and "don't care" is set for write data, other mask condition match, and condition match count. In addition, it will be assumed that the CPU core to be masked is the central processing unit 20. With the above-mentioned setting made, the program is executed on the central processing unit (CPU) 10. If a snoop request occurs due to a cache miss or the like when the command is read and the address is 0x1234567, the mask condition in the snoop request is hit because of matching of command and address. As a result, the snoop controller (SNC) 60 thereafter does not return a response of receive to a snoop request from the central processing unit (CPU) 20. Consequently, the central processing unit (CPU) 20 is stalled in the snoop response wait state. Since the other central processing units are stalled and processing does not progress, the caches are not updated by any central processing unit other than the central processing unit subjected to debugging while the user is debugging the program with the debugger 160.

When the mask condition in the snoop request matches, the snoop control logic (SNPL) 65 of the snoop controller (SNC) 60 notifies the debug controller (DBG) 90 of the condition match through the wiring 110 (S1005). This notification is carried out according to the setting of the notification bit 640 in the condition match notification register (MNR) 64. At the notified debug controller (DBG) 90, a break point exception occurs (S1007). When the setting of notification is not made, notification is not carried out. Whether to cause a break point exception at the debug controller when a snoop is locked can be specified by making the setting of notification on the condition match notification register. The debug controller (DBG) 90 monitors the program running on the central processing unit. When the program meets the break condition (S1006), the debug controller causes a break point exception to occur (S1007). Thereafter, the debug controller (DBG) 90 requests the central processing unit (CPU) to stop execution and the central processing unit (CPU) stops the execution of the program (S1009). With parallel break enabled, the debug controller (DBG) 90 also requests the central processing units other than the central processing unit meeting the condition for causing a break point exception to stop program execution (S1008, S1010). Information for setting parallel break enabled/disabled is held in the parallel break enabling bit of the parallel break register in the debug controller. 0 indicates that parallel break is disabled and 1 indicates that parallel break is enabled. The invention may be so configured that a central processing unit to be stopped can be set on the snoop mask register (SMR) 62 or the debug controller (DBG) 90.

To terminate debugging (S1011), the operation of the central processing unit is restarted. When the operation of the central processing unit is restarted, 0 is written in the release bit 630 of the snoop release register (SRR) 63 and the mask against snoop request receive is removed (S1012). Thus, after the termination of debugging (S1013), snoop requests are received at the snoop controller (SNC) 60 again. The mask against snoop request receive can also be removed by the user accessing the snoop release register (SRR) 63 through the debug controller (DBG) 90 during debugging. This is used when the user desires to restart a snoop request from other central processing units during debugging.

When other central processing units are stopped by causing a break point exception at some central processing unit, it must be carried out through the debug controller (DBG) 90. In addition, the wiring for this is long. Therefore, it takes several cycles to several tens of cycles to give a break notification. For this reason, multiple instructions (D, E, . . . , M) are executed at the other central processing units before they are stopped as illustrated in FIG. 17. This makes it difficult to track down a bug. According to the invention, meanwhile, the following can be implemented: snoop request mask control is carried out at the same time as the occurrence of a break point exception at some central processing unit; and each central processing unit is stalled in the state in which its snoop request is not received and the break notification is completed during this stall period. This is because a mask against snoop request receive is removed by user operation during debugging or when debugging is terminated and it takes more time before the mask is removed. For this reason, only one instruction (D) is executed before the other central processing units are stopped as illustrated in FIG. 18 and this makes it easy to track down a bug.

A parallel processing program in a multi-core system can be efficiently debugged by holding central processing units other than a set central processing unit from executing a snoop operation through the above-mentioned processing.

Up to this point, the invention made by the present inventors has been concretely described based on the embodiment. However, the invention is not limited to the above embodiment and can be variously modified without departing from the subject matter thereof, needless to add.

What is claimed is:

1. An information processing device comprising:
a first processing unit;
a second processing unit;
a debug controller having a break condition register on which a break condition is set; and
a snoop controller having a snoop mask register on which a mask condition is set,
wherein the debug controller monitors a program executed by the first processing unit and causes the first processing unit to stop execution of the program when a state of the program matches the break condition,
wherein when a snoop request from the first processing unit to the snoop controller matches the mask condition, the snoop controller does not receive a snoop request from the second processing unit, and
wherein when a snoop request from the first processing unit to the snoop controller matches the mask condition, the debug controller causes the first processing unit to stop execution of a program.

2. The information processing device according to claim 1, wherein when the state of the program matches the break condition, the debug controller causes the second processing unit to stop execution of a program.

3. The information processing device according to claim 1, wherein at least one of a value of a program counter and write data is set as the break condition.

4. The information processing device according to claim 1, wherein at least one of a command, an address, and write data contained in the snoop request is set as the mask condition.

5. An information processing device comprising:
a first processing unit;
a second processing unit;
a debug controller having a break condition register on which a break condition is set; and
a snoop controller having a snoop mask register on which a mask condition is set,
wherein the debug controller monitors a program executed by the first processing unit and causes the first processing unit to stop execution of the program when a state of the program matches the break condition,
wherein when a snoop request from the first processing unit to the snoop controller matches the mask condition, the snoop controller does not receive a snoop request from the second processing unit, and
wherein when a snoop request from the first processing unit to the snoop controller matches the mask condition, the debug controller causes the second processing unit to stop execution of a program.

6. An information processing device comprising:
a plurality of processing units;
a debug controller having a break condition register on which a break condition is set; and a snoop controller having a snoop mask register on which a mask condition is set, wherein the debug controller monitors a program executed by the processing units and causes a first processing unit to stop execution of the program when a state of a program executed by the first processing unit, which is one of the processing units, matches the break condition, wherein when a snoop request from the first processing unit to the snoop controller matches the mask condition, the snoop controller does not receive a snoop request from processing units other than the first processing unit, and wherein when the snoop request from the first processing unit to the snoop controller matches the mask condition, the debug controller causes said one or more processing units other than the first processing unit to stop execution of a program.

7. The information processing device according to claim 6, wherein when the state of the program executed by the first processing unit matches the break condition, the debug controller causes one or more processing units other than the first processing unit to stop execution of a program.

8. The information processing device according to claim 6, wherein at least one of a command, an address, and write data contained in the snoop request is set as the mask condition.

9. A debug method comprising the steps of:

causing a debug controller to monitor a program executed by a first processing unit, and when a state of the program matches a break condition set on a break condition register in the debug controller, causing the first processing unit to stop execution of the program;

preventing a snoop controller from receiving a snoop request from a second processing unit when a snoop request from the first processing unit to the snoop controller matches a mask condition set on a snoop mask register in the snoop controller; and stopping, by the debug controller, execution of a program of the first processing unit when a snoop request from the first processing unit to the snoop controller matches the mask condition.

10. The debug method according to claim 9, further comprising:

stopping, by the debug controller, execution of a program of the second processing unit when a state of the program matches the break condition.

11. The debug method according to claim 9, wherein at least one of a value of a program counter and write data is set as the break condition.

12. The debug method according to claim 9, wherein at least one of a command, an address, and write data contained in the snoop request is set as the mask condition.

13. A debug method comprising the steps of:

causing a debug controller to monitor a program executed by a first processing unit, and when a state of the program matches a break condition set on a break condition register in the debug controller, causing the first processing unit to stop execution of the program;

preventing a snoop controller from receiving a snoop request from a second processing unit when a snoop request from the first processing unit to the snoop controller matches a mask condition set on a snoop mask register in the snoop controller; and stopping, by the debug controller, execution of a program of the second processing unit when a snoop request from the first processing unit to the snoop controller matches the mask condition.

* * * * *